United States Patent Office 3,784,526
Patented Jan. 8, 1974

---

3,784,526
WATER SOLUBLE POLYMER COMPOSITIONS AND PROCESS FOR PREPARATION THEREOF
Alain Ribba, 16 Rue Ronsard, Chateaurenault, France
No Drawing. Filed Feb. 18, 1972, Ser. No. 227,650
Claims priority, application France, Feb. 18, 1971, 6,571
Int. Cl. C08f 15/40
U.S. Cl. 260—78.5 R    6 Claims

ABSTRACT OF THE DISCLOSURE

The invention provides a process for making novel water-soluble polymers which are useful as flocculating agents. These polymers are formed by polymerization of (a) itaconic acid, or the water soluble sodium or ammonium salts thereof, in proportion of from 0.2 to 15 percent by weight; (b) a monomer of an amide of unsaturated alpha-beta monocarboxylic acid, such as acrylamide or immediate derivatives thereof, in proportion of from 5 to 95 percent by weight; (c) an unsaturated water-soluble monomer, for example: acrylic acid or maleic acid, and the salts of said acids; allylalcohol, and derivatives thereof. The polymerization is carried out by dispersing the three above-described monomers (a), (b) and (c) in a water insoluble organic medium, e.g., toluene in presence of a surface-active agent such as sulphonated petroleum distillate with a molecular weight in the range of 300 to 1000, a polymerization catalyst, in proportion of 0.005 to 0.2 percent by weight, e.g., ammonium persulfate. A Redox reducing agent is preferable in this system.

BACKGROUND OF THE INVENTION AND PRIOR ART

The present invention relates to new water-soluble substances which are useful as flocculation agents. More particularly, the invention relates to new terpolymer compositions effective within a great variety of media.

A large number of substances exist that are useful as flocculation or coagulation agents of solids in aqueous suspension. In the beginning, these substances were of natural origin, such as, for example, starch and aluminum sulphate. Then there appeared synthetic substances useful as such agents, such as water-soluble polymers. These synthetic polymers can be divided into three large classifications:

(1) Polymers having negative charges distributed over the polymer chain in an aqueous medium: these are the anionic flocculants;

(2) Polymers having positive charges distributed over the polymer chain in an aqueous medium: these are the cationic flocculants; and (3) Finally, those polymers which do not form ions in an aqueous medium: these are the non-ionic flocculants.

The polymers of the first categories (1) and (2) are still called polyelectrolytes.

These three classes of polymers are obtained in particular by homo-polymerizing or by co-polymerizing acrylamide with carefully chosen monomers. Among the anionic flocculants utilized, sodium acrylamide, or ammonium acrylate co-polymers have particular importance. It is also known that the flocculation of solids is suitably effected only if the polymers used are linear polymers, in other words, polymers having the least possible ramifications or bridges, and having a molecular weight of at least $10^6$.

However, according to the nature and the concentration of solids in suspension (the nature of the aqueous medium, its pH, its temperature, etc.) it is very often difficult to obtain maximum effectiveness in the flocculation. In other words, it is difficult at the same time to obtain flocs having sufficient density and dimensions for obtaining a rapid speed of decantation and a perfectly clear supernatant liquid.

OBJECTS OF THE INVENTION

It is an object of the present invention to furnish new water-soluble terpolymer compositions utilizable as flocculation agents in a large variety of media, which compositions fall within the category of polyanionics.

Another object of the invention is to furnish new flocculation agents, more specifically, those suitable for improving the speed of decantation of the flocs by increasing their dimensions and their density.

A further object of the invention is to furnish new flocculation agents, and more specifically, agents which are suitable for improving the limpidity of the supernatant liquid after decantation of the matter in suspension.

DESCRIPTION OF THE INVENTION

The present invention has allowed for the discovery of new water-soluble polymer substances utilizable as flocculation agents, and more particularly, new water-soluble terpolymer substances, with high molecular weight, which polymer compositions are advantageously utilizable as flocculation agents of solids in aqueous suspension.

The present invention rests essentially on the fact, discovered unexpectedly, that the polymerization of (a) itaconic acid or its soluble salts with:

(b) On the one hand, a water-soluble monomer of an amide of an unsaturated alpha,beta monocarboxylic acid;

(c) On the other hand, an unsaturated water-soluble monomer having a double bond in alpha,beta position, results in new terpolymer compositions having excellent solubility in water and advantageously meeting the qualities for flocculating agents outlined above.

Thus, it is in the simultaneous co-polymerization of these three substances: (a), (b) and (c) in the proportions that are set forth herein and by the methods that are described herein, that the essential characteristic of the present invention is found.

The aforesaid three monomers (a), (b) and (c) are copolymerized in a single stage, in the presence of some of the others in such manner as to form a terpolymer, the type and the quantity of the recurrent patterns depending solely upon the quantity of each of the monomers used. It is difficult to determine the exact structure of the terpolymer, but it is believed that a statistical structure can be obtained according to the relative proportions of the different monomers.

It is possible to apply the different techniques of known radicular polymerization that allow for obtaining the high molecular weights. However, the particular techniques adapted for the obtainment of the terpolymers of this invention are those which are described hereinbelow.

(1) The first essential monomer reagent within the framework of the invention is itaconic acid or its water-soluble salts of sodium or ammonium.

The formula of itaconic acid is the following

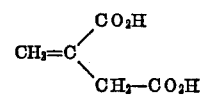

The quantities of itaconic acid or its water-soluble salts necessary for obtaining the improvements described within the framework of the invention vary from 0.2 to 15% by weight of the total monomers. A preferred composition of the terpolymer comprises 2 to 10% by weight itaconic acid or its water-soluble salts in relation to the total (number of) monomers.

(2) The second monomer reagent of the invention is the unsaturated alpha-beta amide of monocarboxylic acid, having the formula:

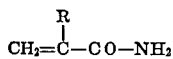

in which R is hydrogen or an alkyl group.

A preferred second monomer of the invention is the acrylamide:

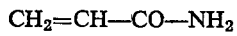

The quantities of acrylamide can vary in very large limits from 5 to 95% by weight of total monomers, depending on whether one wishes to obtain a terpolymer that is strongly, medium, or slightly anionic.

(3) The third monomer of the invention is an unsaturated alpha-beta ethylene water-soluble monomer that is co-polymerized with the first two monomers and contains polar groups. As an example of such monomers, acrylic acid is cited, together with its water-soluble salts; methacrylic acid and its water-soluble salts; the unsaturated polycarboxylic acids and their water-soluble salts, such as maleic acid, for example, carboxymethyl acrylate or its salts, the unsaturated hydroxyl and hydroxy-soluble monomers, such as allylalcohol, ethylene glycol acrylate or its hydrosoluble salts of sodium and ammonium. The quantities of this third monomer also vary in somewhat large proportions, from 5 to 95% by weight of the total monomers content.

The terpolymers according to the invention are obtained by any known polymerization techniques that allow for the obtainment of high molecular weight polymers. However, one particular technique that has been adapted to the obtaining of the terpolymers according to the invention is the one called "inverse emulsion," in the sense that a "water in oil" emulsion is prepared from a concentrated aqueous solution of the above-described monomers in an organic medium, which is neither solvent nor monomer nor polymer, and which is obtained by means of a surface-active agent. The aqueous solution of monomers is then divided into small droplets dispersed within the organic medium and the radical polymerization is begun within these droplets. Thus, the technique consists of effecting a broad polymerization in aqueous solution within an organic liquid that plays the double role of heat exchanger and fluidizing agent, even though the direct polymerization, without organic medium, of the aqueous monomer solution would lead to a gel, taking into account the high molecular weight obtained. Another advantage of this technique is to be able to obtain at the end of polymerization, direct terpolymers in granule or powder form by elimination of the polymerization water through distillation.

The most important point of this polymerization technique consists of obtaining, during polymerization, terpolymer microgels dispersed within the organic medium which do not bind to each other and which do not stick to the walls of the reactor or to the shaft of the agitator. The agitation or stirring allows for maintaining the dispersed aqueous phase in the organic phase, but it is necessary to use, in addition, a surface-active agent so as to make maximum avoidance of any sticking of the microgels to the walls and to the shaft of the agitator. Numerous surface-active agents favoring the "water in oil" emulsion can be used; however, it has been found that the products best suited to the framework of the invention are derivatives of sulphonated petroleum distillates and their sodium or calcium salts. These petroleum cuts have the general formula: $CxHySO_3Na$ or $(CxHySO_3)Ca$, with $x$ ranging between 20 and 30, and $y$ ranging between 30 and 45. The molecular weights of such surface-active agents must range between 300 and 1000.

Among the other surface-active agents that can be utilized within the framework of the invention, the esters of sorbitol can be cited, such as sorbitol tristearate, the oxyethylene derivates of fatty amines. The necessary quantities of surface-active agent used within the framework of the invention vary from 0.1 to 2% by weight in relation to the organic medium.

The aqueous monomer solutions of the invention contain from 30 to 65% by weight of monomers, and from 35 to 70% by weight water. These aqueous solutions are dispersed within the organic medium by means of agitation, and the surface-active agent is dispersed the proportion of 20 to 30% by weight of aqueous solution to 80 to 70% by weight of the organic medium. A preferred composition is 25% by weight aqueous solution to 75% by weight organic medium.

By the term organic medium is understood any product which is not solvent, nor monomer, nor terpolymer which is obtained and which has a boiling point greater than the boiling point of the preferred water. A product allowing for the obtainment of an azeotrope with water is preferred for facilitating the elimination of the water in the final phase of the polymerization. Among the numerous products that can be used, aromatic and aliphatic hydrocarbons are cited; a particularly favorable product is toluene.

The catalysts used for initiating the polymerization of such a system are catalysts with radical dissociation, which dissociate under the action of heat or under the action of a reducer compound at the lowest temperature. Among the catalysts that are used within the framework of the invention, are ammonium persulphate, potassium persulphate, oxygenated water, azo-bis-isobutyronitrate, the organic peroxides and hydroperoxides can be cited.

Among the reducing agents used, sodium metabisulphite, the thiosulphates, the bisulphites, the hydrosulphites are illustrative of the invention.

A catalyst system particularly suited to the preparation of the terpolymers according to the invention is a redox system, which allows for low temperature polymerization so as to obtain the highest molecular weight. The redox catalyst necessitates a careful elimination of traces of oxygen dissolved in the medium in order to shorten the treatment period of the polymerization. This is done by carrying out the polymerization under a current of nitrogen and with slight vacuum so as to eliminate and prevent any entry of air that might be harmful to the obtainment of the high molecular weights. The amounts of catalyst used vary from about 0.005% to 0.2% by weight in relation to the monomers. The preferred amounts vary from about 0.05% to 0.15% by weight based on total monomer content.

The polymerization temperatures according to the invention are preferably low. They range between 30° and 80° C. These polymerization temperatures are obtained by the polymerization heat of the monomers. It is often necessary to resort to cooling so that the reaction does not become violent. An effective means for mastering the polymerization temperature is to work under a certain reduced pressure in order to benefit from the reflux of the organic medium which, when condensing in the coolant, contributes large calories to the reactional medium. An adequate polymerization temperature is around 65° to 75° C., under pressure of 200–250 mm. of mercury.

The following examples give some illustrations of the invention but are not to be construed as limitative of the invention:

EXAMPLE 1

First of all, 4 g. of itaconic acid are dissolved in 220 g. of bi-permuted water in a beaker. 8 g. of acrylic acid are added to this solution and with the temperature being maintained at less than 30° C., the necessary quantity of NaOH (50%) is added in order to bring the pH to 8.5.

To the foregoing mixture is added 250 g. of acrylamide, which is dissolved at a temperature of ≤30° C.

In a reactor of 2000 cm.³ equipped with an agitator, a thermometer and a direct-reflux coolant, 4 g. of the selected emulsifier (sulphonate of Na from a petroleum cut of PM≃450–500) is dissolved in 1500 cm.³ of toluene; the solution of monomers prepared above is added while stirring well so as to disperse correctly the aqueous phase in the toluene and the nitrogen is vigorously purged for 15 to 20 minutes.

Then 0.4 ml. of a 10% ammonium persulphate solution and 1 ml. of a 10% sodium metabisulphite solution are added and placed in vacuum (250 mm. Hg) while heating the reaction medium in a water bath. Around 60–65° C., a thermal reaction is produced. The toluene is boiled, the reaction tempered, which is maintained at 70–75° C. for 30–40 minutes. The temperature again drops to 65–67° C. at the end of this step, a second quantity of catalyst is added, that is identical to the first, in order to complete the polymerization. There is a second exothermal reaction, less violent than the first; the temperature rises to 70° C.; this temperature is maintained for still another hour; then the water present in the medium is vacuum distilled in a Dean-Stark trap. The toluene decants in the upper layer and continually drops back into the reactor. The distillation lasts until around 210 g. of water is withdrawn. There is then, in the reactor, a solid product dispersed in the toluene phase. Filtering and washing is done with toluene or isopropanol so as to eliminate the surface-active agent and the last traces of water. The product is vacuum dried at 50–60° C. The reactor contains practically no residue stuck to the walls.

Finally, a terpolymer powder is obtained that contains 2.5% sodium itaconate, 3.5% sodium acrylate and 94% acrylamide, the viscosity of which at 1% in the water gives 2000 cps. measured with the Brookfield $RV_3$, speed 1.

The polymer obtained is designated by A in the following tables.

EXAMPLE 2

10 g. of itaconic acid and 30 g. of acrylic acid are dissolved in 220 g. of bipermuted water; by means of a 50% sodium solution, the pH is neutralized at 8–8.5. Then 160 g. of acrylamide is added, while keeping the dissolution temperature less than 30° C.

1400 cm.³ of toluene is placed in the reactor along with 5 g. of the selected emulsifier (sulphonate of Na from a petroleum cut of PM≃400–450); the emulsifier is correctly dissolved in the toluene and with vigorous stirring the aqueous mixture of monomers is introduced. The nitrogen is vigorously purged for 20 minutes.

Then 0.35 ml. of a 10% ammonium sulphate solution is added together with 1 ml. of a 10% sodium metabisulphite solution and vacuum heated to 65–70° C. An exothermic reaction is produced. The toluene is placed in the reflux and the temperature maintained at 70–72° C. for 45 minutes. After this temperature is obtained, a second quantity of catalyst is added in order to complete the polymerization and maintained for still another hour at 70° C.

Afterwards, the azeotropic distillation of the water is effected in a separator so as to eliminate around 220 g. of water. In the course of this distillation, the gels present in the medium are transformed into white, solid granules. At the end of the distillation of the water, the product is placed at atmospheric pressure and discharged, while filtering. After crushing and drying, a terpolymer containing 5% by weight itaconic acid in Na salt form is obtained; the terpolymer also contains 15% by weight acrylic acid in Na salt form and 80% by weight acrylamide. The viscosity of the terpolymer dissolved at 1% in water is 3500 (Brookfield $RV_3$, speed 1).

The polymer obtained is designated by B in the following tables.

EXAMPLE 3

The procedure is carried out in the same manner as in the previouss examples, but modifying the weight relationships of the monomers. Thus, a terpolymer is prepared using monomers: 8% by weight itaconic acid, 22% by weight acrylic acid and 70% by weight acrylamide.

EXAMPLE 4

A terpolymer is prepared from monomers of 5% by weight itaconic acid, 15% by weight methacrylic acid and 80% by weight acrylamide. It is designated as polymer D in the following Table I.

In order to evaluate the flocculating properties of the terpolymers prepared according to the invention, a Hydrocure apparatus is used; this is a 5-beaker unit, each beaker being of 1 liter capacity; the unit is equipped with a variable-speed agitator, driven by a single motor.

The medium subject to flocculation is dispersed by agitation at the rate of 150 r.p.m. Solutions of flocculation products are prepared with a concentration of 1‰, and increasing quantities of these solutions are introduced into the beakers. Agitation is effected for 30 seconds more at 150 r.p.m., then the speed is reduced to 40 r.p.m. The decantation speed is then observed and the limpidity of the supernatant liquid is also noted so as to determine the necessary quantity for obtaining the best flocculation results.

The terpolymers described in the previous examples are comparable to a commercial copolymer of sodium acrylate-acrylamide (sodium acrylate/acrylamide ratio around 50/50).

The results are given in the following tables:

TABLE I

Results of first medium studied—a kaolin suspension in water at 200 p.p.m.

| | A | B | C | D | Commercial polymer |
|---|---|---|---|---|---|
| Appearance of flocs | Heavy and fatty | Fatty and thick | Fatty and thick | Fatty and thick | Average. |
| Decantation speed | 25 sec | 30 sec | 35 sec | 35 sec | 50 sec. |
| Clearness | Good to excellent | Good | Good | Good | Slightly cloudy; flocs in suspension. |
| Optimum quantity | 5 p.p.m | 7 p.p.m | 7 p.p.m | 10 p.p.m | 10 p.p.m. |

TABLE II

Results of second medium studied—a dispersion of titanium oxide at 500 p.p.m.

| | A | B | C | D | Competing product |
|---|---|---|---|---|---|
| Appearance of flocs | Fatty and thick | Fatty and thick | Excellent | Excellent | Average. |
| Speed | 35 sec | 40 sec | 40 sec | 45 sec | 1 minute. |
| Clearness | Excellent | Good | Excellent | Good to excellent | Average. |
| Optimum quantity | 5 p.p.m | 10 p.p.m | 8 p.p.m | 7 p.p.m | 10 p.p.m. |

TABLE III

Results of third mediums studied—a dispersion of champagne chalk at 200 p.p.m

| | A | B | C | D | |
|---|---|---|---|---|---|
| Appearance of flocs | Excellent | Excellent | Excellent | Excellent | Average. |
| Speed | Immediate | 10 sec | 8 sec | 15 sec | 30 sec. |
| Clearness | Excellent | Excellent | Good to excellent | Good | Several flocs in suspension. |
| Optimum quantity | 10 p.p.m | 15 p.p.m | 10 p.p.m | 15 p.p.m | 10 p.p.m. |

Among the other mediums studied in which the terpolymers according to the invention have been utilized successfully, the following are cited: dispersions of iron oxide ore, dispersions of copper ore, uranium, red sludge from the treatment of bauxite, residual industrial water, sewage water, waste water, carbon dispersions, caustic solutions, lead water from paper mills.

Of course, the invention is not limited to only these applications, rather only to the methods of preparation which have been described by way of example.

What is claimed is:
1. Water-soluble polymer compositions, useful as flocculation agents, which comprise terpolymers from the polymerization of a composition consisting essentially of:
   (a) a member selected from the group consisting of itaconic acid, and its water-soluble sodium, and ammonium salts, in the proportion of from about 0.2 to 15% by weight of total composition;
   (b) a monomer of an amide of an unsaturated alpha, beta-monocarboxylic acid, in the proportion of from about 5 to 95% by weight of total composition; and
   (c) an alpha, beta-ethylenically unsaturated water-soluble monomer in the proportion of from about 5 to 95% by weight of total composition.
2. Polymer composition according to claim 1, wherein monomer (b) is acrylamide.
3. Polymer composition according to claim 1, wherein monomer (c) is a member selected from the group consisting of acrylic acid, methacrylic acid, maleic acid, and water soluble salts of said acids, allyl alcohol, and water soluble ethyleneglycol acrylate and salts thereof.
4. Polymer composition according to claim 1, wherein monomer (b) is acrylamide and monomer (c) is a member selected from the group consisting of acrylic acid or the salts thereof, maleic acid and the salts thereof, allyl alcohol and the derivatives thereof.
5. Polymer composition according to claim 1, wherein monomer (b) is acrylic acid.
6. Polymer composition according to claim 1, wherein monomer (b) is acrylamide and monomer (c) is acrylic acid.

References Cited
UNITED STATES PATENTS

| | | | |
|---|---|---|---|
| 3,658,772 | 4/1972 | Volk et al. | 260—80.3 N |
| 3,321,431 | 5/1967 | Cruden et al. | 260—29.6 |
| 3,211,708 | 10/1965 | Zimmerman et al. | 260—78.5 |
| 3,311,579 | 3/1967 | Donat | 260—23 |
| 3,479,283 | 11/1969 | Harrison et al. | 210—54 |
| 3,634,366 | 1/1972 | Chujo et al. | 260—78.5 |

FOREIGN PATENTS 1,202,929  1/1960  France.

JOSEPH L. SCHOFER, Primary Examiner
J. KIGHT III, Assistant Examiner

U.S. Cl. X.R.

210—54; 260—29.6 T, WB